United States Patent [19]

Pruett et al.

[11] 4,339,309

[45] Jul. 13, 1982

[54] METHOD FOR REMOVING FLUORIDE CONTAMINATION FROM NITRIC ACID

[75] Inventors: David J. Pruett, Knoxville; William B. Howerton, Kingston, both of Tenn.

[73] Assignee: The United States of America as represented by the United States Department of Energy, Washington, D.C.

[21] Appl. No.: 260,622

[22] Filed: May 5, 1981

[51] Int. Cl.³ .......................... B01D 3/16; B01D 53/20
[52] U.S. Cl. ........................................ 203/29; 203/31; 423/390
[58] Field of Search ................ 423/77, 111, 136, 492, 423/495, 390; 203/28, 29, 31, 13, 33; 261/DIG. 72

[56] References Cited

U.S. PATENT DOCUMENTS

| | | | |
|---|---|---|---|
| 3,106,515 | 10/1963 | Williams | 203/13 |
| 3,595,626 | 7/1971 | Sowards | 261/DIG. 72 |
| 3,846,256 | 11/1974 | Dietrich | 203/33 |

Primary Examiner—Frank Sever
Attorney, Agent, or Firm—Edwin D. Grant; Stephen D. Hamel; Richard G. Besha

[57] ABSTRACT

Fluoride ions are removed from nitric acid solution by contacting the vaporized solution with alumina or zirconium.

3 Claims, 2 Drawing Figures

METHOD FOR REMOVING FLUORIDE CONTAMINATION FROM NITRIC ACID

BACKGROUND OF THE INVENTION

One currently used method for removing a fluoride from nitric acid solutions is described in U.S. Pat. No. 3,846,256. In this method, aluminum and calcium are added to a contaminated nitric acid solution to form non-distillable fluoride complexes, and then nitric acid is distilled from the solution while leaving the complexes in the distillation vessel. However, this process has several disadvantages, including the inconvenience and interruption of operation caused by the required periodic removal of the fluoride precipitates from the distillation vessel used therein.

SUMMARY OF THE INVENTION

It is therefore an object of this invention to provide a convenient and efficacious method for removing a fluoride from a nitric acid solution.

Another object of the invention is to remove a fluoride from a nitric acid solution by a process that combines the fluoride with solids convenient to handle as waste material.

These objects and other advantages are attained by a process comprising the steps of: (1) distilling a solution containing a fluoride, nitric acid, and water to form a vapor containing the same substances; (2) contacting the vapor with particles selected from the group consisting of alumina, zirconia, or mixtures thereof to combine the fluoride in the vapor with the particles; and (3) condensing the vapor from which the fluoride has been thus removed.

DETAILED DESCRIPTION

Figure 1:
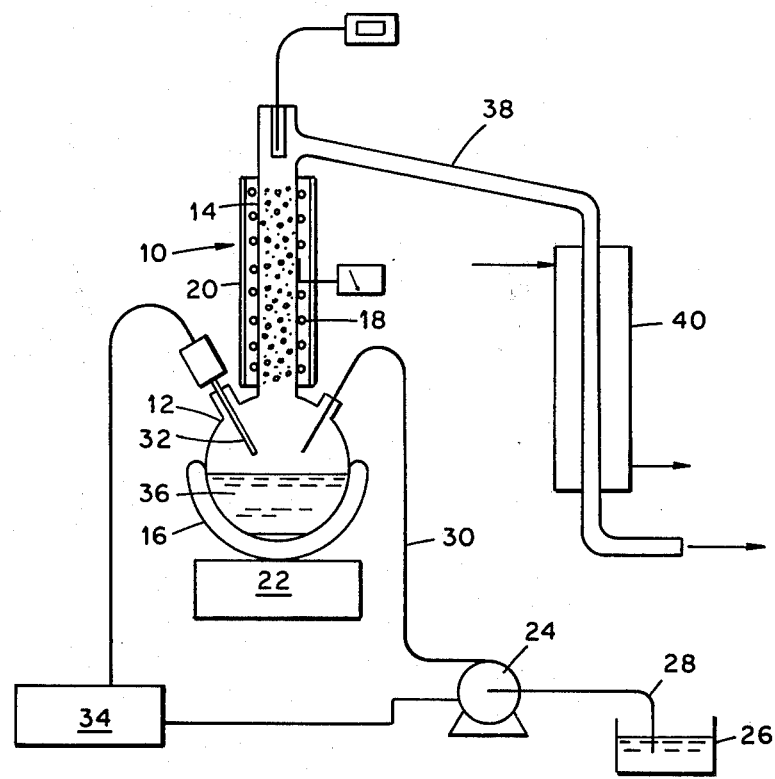
FIG. 1 is a diagrammatic representation of an apparatus used for conducting tests which showed the efficacy of the invention.

The process of the invention can be conducted by use of the apparatus illustrated in FIG. 1, wherein reference number 10 generally designates a distillation vessel including an evaporation chamber 12 and a column 14 packed with alumina or zirconia pellets. Chamber 12 sits in a heating mantle 16, and column 14 is wrapped with heating tape 18 and insulation 20. Contaminated nitric acid solution held in chamber 12 is continuously stirred by a magnetic element (not shown) rotated in the solution by a magnetic stirrer 22. The acid solution is supplied to chamber 12 by a pump 24 connected to a supply tank 26 by a conduit 28 and to the chamber by a conduit 30. Pump 24 is controlled by a liquid level sensor 32 situated in chamber 12 and connected to the pump through a relay controller 34.

Vapors from the boiling contaminated nitric acid solution 36 in chamber 12 pass into column 14 where the fluoride therein is preferentially absorbed by the alumina or zirconia pellets. The column is maintained at a temperature of 150° C. to prevent condensation of the vapors. Vapor from which the fluoride has been removed then pass through conduit 38 to a water-cooled condenser 40.

EXAMPLE I

Distillation vessel 10 was provided with a column 14 having an inside diameter of 2.4 cm and a length of 25 cm and packed with 117 grams of ⅛ inch Alcoa H-151 activated alumina pellets that had been heated at a temperature of 1100° C. in air for 18 hours. A volume of 500 ml of 9.84 M nitric acid solution containing 9,900 ppm $F^-$ as HF (total solution $[H^+] = 10.37$ M) was placed in chamber 12. Distillate from this solution was passed through column 14 and was collected after condensation in nine 50 ml fractions and analyzed for fluoride and total acid concentrations, which are presented in the following table:

TABLE I

| Sample No. | 1 | 2 | 3 | 4 | 5 | 6 | 7 | 8 | 9 |
|---|---|---|---|---|---|---|---|---|---|
| $[H^+]$ (N) | 1.32 | 3.74 | 5.60 | 8.03 | 9.25 | 12.01 | 13.53 | 14.14 | 15.05 |
| $[F^-]$ ppm | 0.14 | 0.26 | 0.20 | <0.01 | 0.07 | 0.015 | <0.01 | <0.01 | |

The residue was then removed from chamber 12, and a fresh charge of 500 ml of 10.86 M nitric acid solution containing 20,626 ppm $F^-$ as HF (total solution $[H^+] = 11.95$ M) was placed in the chamber. Distillate from this solution was passed through column 14 without changing the alumina therein. Condensate was again collected in nine 50 ml fractions and analyzed, showing the concentrations listed in the following table:

TABLE II

| Sample No. | 1 | 2 | 3 | 4 | 5 | 6 | 7 | 8 | 9 |
|---|---|---|---|---|---|---|---|---|---|
| $[H^+]$ (N) | 4.66 | 5.83 | 6.55 | 10.00 | 11.55 | 12.99 | 14.14 | 14.75 | 15.16 |
| $[F^-]$ ppm | <0.01 | 2.83 | 13.37 | 16.93 | 17.23 | 15.70 | 10.55 | 5.02 | 0.98 |

The results shown in Table II show good fluoride removal by the alumina in column 14 even with a more concentrated fluoride solution and a partially used alumina.

The residue in chamber 12 was next replaced with 500 ml of 10.51 M nitric acid solution containing 10,390 ppm $F^-$ as HF (total solution $[H^+] = 11.06$ M). The same test procedure used in the previous tests produced the results summarized in the following table:

TABLE III

| Sample No. | 1 | 2 | 3 | 4 | 5 | 6 | 7 | 8 | 9 |
|---|---|---|---|---|---|---|---|---|---|
| $[H^+]$ (N) | 4.19 | 5.86 | 7.54 | 9.22 | 10.89 | 12.49 | 14.14 | 14.80 | 15.55 |
| $[F^-]$ ppm | 0.16 | 4.85 | 8.88 | 9.80 | 9.51 | 9.45 | 6.57 | 3.61 | 0.76 |

A total of 13.5 grams of fluoride was absorbed on the alumina in column 14 in these three tests, apparently without saturating the column.

EXAMPLE II

The apparatus illustrated in FIG. 1 was set up to maintain a constant volume of 500 ml and 716 ppm $F^-$ in chamber 12. Since this solution distilled off 10.2 M nitric acid, a nitric acid feed solution containing 10.23 M $H^+$ and 1070 ppm $F^-$ was pumped into chamber 12 automatically to maintain a constant solution composition therein and thus a constant nitric acid concentration in the vapor. The solution was distilled through an alumina column identical to the one used on Example I, at a rate of approximately 1.6 ml/min. A collector receiving condensate from condensor 38 was arranged to begin collecting a new sample every 14 minutes. Selected fractions were analyzed for fluoride and total acid. The results are summarized in the following table:

TABLE IV

| Sample No. | $H^+$ N | $F^-$ μg/ml | Sample No. | $H^+$ N | $F^-$ μg/ml |
|---|---|---|---|---|---|
| 1 | 10.48 | 5.22 | 140 | 10.29 | 1.89 |
| 10 | 10.13 | 0.36 | 150 | 10.52 | 2.56 |
| 20 | 9.82 | 0.34 | 160 | 10.42 | 3.19 |
| 30 | 9.96 | 0.12 | 170 | 10.63 | 3.77 |
| 40 | 11.03 | 0.74 | 180 | 10.45 | 4.61 |
| 50 | 10.45 | 0.70 | 190 | 10.52 | 5.37 |
| 60 | 10.39 | 0.74 | 200 | 10.48 | 6.01 |
| 70 | 10.09 | 1.06 | 210 | 10.09 | 7.28 |
| 80 | 10.41 | 0.76 | 220 | 9.77 | 8.28 |
| 90 | 10.05 | 1.12 | 230 | 10.60 | 8.68 |
| 100 | 10.36 | 1.10 | 240 | 10.32 | 6.87 |
| 110 | 10.32 | 0.90 | 250 | 10.58 | 9.37 |
| 120 | 10.10 | 1.35 | 260 | 10.29 | 10.6 |
| 130 | 10.02 | 1.66 | 270 | 10.69 | 11.7 |
| 280 | 10.60 | 12.2 | 680 | 10.56 | 66.5 |
| 290 | 10.43 | 12.9 | 690 | 10.75 | 71.6 |
| 300 | 10.26 | 13.4 | 700 | 9.34 | 76.2 |
| 310 | 10.59 | 13.5 | 710 | 10.27 | 79.3 |
| 320 | 10.35 | 13.7 | 720 | 10.51 | 85.6 |
| 330 | 10.31 | 13.0 | 730 | 10.40 | 91.6 |
| 340 | 10.22 | 13.1 | 740 | 10.55 | 99.0 |
| 350 | 10.64 | 13.6 | 750 | 9.93 | 94.3 |
| 360 | 10.67 | 12.8 | 760 | 10.59 | 98.2 |
| 370 | 10.65 | 11.3 | 770 | 10.34 | 103.7 |
| 380 | 10.71 | 11.8 | 780 | 10.45 | 109.0 |
| 390 | 10.64 | 11.5 | 790 | 10.57 | 118.3 |
| 400 | 11.10 | 12.0 | 800 | 10.75 | 123.9 |
| 410 | 10.62 | 12.3 | 810 | 10.43 | 126.2 |
| 420 | 10.60 | 13.0 | 820 | 10.47 | 135.7 |
| 430 | 10.78 | 13.7 | 830 | 10.58 | 144.4 |
| 440 | 10.67 | 16.7 | 840 | 10.80 | 153.7 |
| 450 | 10.55 | 17.5 | 850 | 10.67 | 152.4 |
| 460 | 10.70 | 18.9 | 860 | 10.65 | 161.9 |
| 470 | 10.62 | 18.7 | 870 | 10.59 | 157.7 |
| 480 | 10.73 | 18.7 | 880 | 9.84 | 168.4 |
| 490 | 10.45 | 18.3 | 890 | 10.59 | 166.2 |
| 500 | 10.92 | 19.1 | 900 | 10.70 | 172.9 |
| 510 | 10.71 | 21.6 | 910 | 10.67 | 177.4 |
| 520 | 10.39 | 23.1 | 920 | 10.48 | 171.8 |
| 530 | 10.39 | 21.8 | 930 | 10.65 | 175.2 |
| 540 | 9.29 | 23.2 | 940 | 10.58 | 175.2 |
| 550 | 10.80 | 26.5 | 950 | 10.61 | 168.0 |
| 560 | 10.68 | 28.8 | 960 | 10.56 | 178.8 |
| 570 | 10.52 | 30.4 | 970 | 10.59 | 183.8 |
| 580 | 10.53 | 32.1 | 980 | 10.76 | 191.5 |
| 590 | 10.63 | 33.9 | 990 | 10.77 | 199.8 |
| 600 | 10.47 | 35.8 | 1000 | 10.04 | 208.5 |
| 610 | 11.12 | 40.2 | 1010 | 10.74 | 219.5 |
| 620 | 10.62 | 44.0 | 1020 | 10.83 | 220.4 |
| 630 | 10.69 | 47.2 | 1030 | 10.72 | 234.8 |
| 640 | 10.54 | 50.0 | 1040 | 10.63 | 245.9 |
| 650 | 10.74 | 50.7 | 1050 | 10.80 | 253.9 |
| 660 | 10.58 | 56.9 | 1054 | 10.65 | 245.9 |

TABLE IV-continued

| Sample No. | $H^+$ N | $F^-$ μg/ml | Sample No. | $H^+$ N | $F^-$ μg/ml |
|---|---|---|---|---|---|
| 670 | 10.49 | 61.0 | | | |

Figure 2:
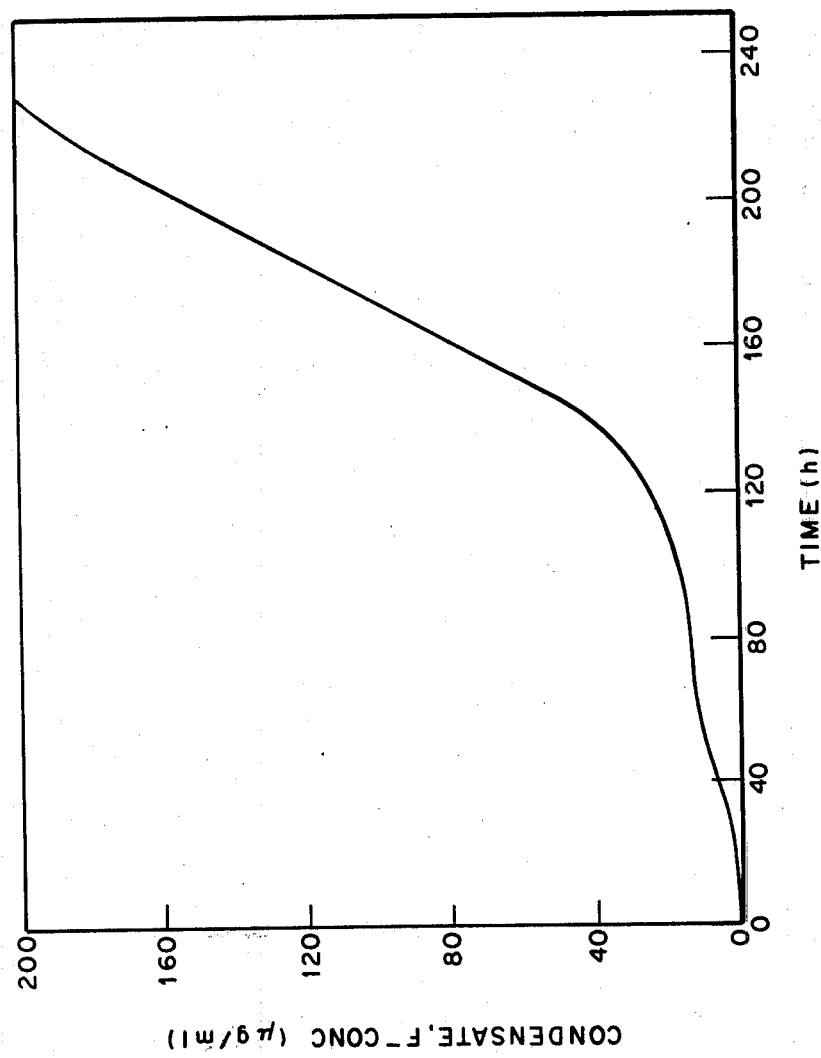
FIG. 2 is a group illustrating test data relating to the invention.

The concentration of fluoride in the distillate of column 14 as a function of time is illustrated in FIG. 2 for this example.

It will be noted that column 14 operated approximately 60 hours and processed 5.7 liters of solution before fluoride concentration in the distillate significantly exceeded 10 ppm. The system operated another 60 hours before fluoride concentration in the distillate rose above 20 ppm, at which point the fluoride concentration increased steadily.

EXAMPLE III

The test procedure of Example I was repeated with alumina in column 14 replaced with 201 grams of fused, refractory grain, stabilized zirconia sold under the trademark Zirnorite, this material being partially crushed and the particles selected for the column being those which passed through a 10 mesh screen and which were retained on a 20 mesh screen. A volume of 500 ml of a 10.65 M nitric acid solution containing 4,740 ppm $F^-$ as HF (total solution $[H^+]=10.90$) was placed in chamber 12 and distilled through the zirconia column. Nine 50 ml samples of condensate from the column were collected and analyzed, with the results summarized in the following table:

TABLE V

| Sample No. | 1 | 2 | 3 | 4 | 5 | 6 | 7 | 8 | 9 |
|---|---|---|---|---|---|---|---|---|---|
| $[H^+]$ (N) | 3.27 | 4.95 | 6.39 | 8.20 | 10.23 | 12.10 | 13.43 | 14.60 | 15.08 |
| $[F^-]$ ppm | 2.26 | 4.17 | 5.69 | 6.32 | 6.22 | 5.72 | 4.51 | 3.00 | 1.70 |

The above examples show that the use of alumina or zirconia to absorb fluorides from a vaporized nitric acid solution is an effective method for decontaminating the solution for further use. Also, as mentioned before, the alumina or zirconia used in the absorption column can readily be disposed of after it has been saturated with the fluoride. The use of two columns alternately would permit continuous distillation of the contaminated acid, with the alumina or zirconia being removed from one column while the other is operating.

What is claimed is:

1. A method for purifying a solution containing a fluoride, nitric acid, and water, comprising the steps of:
    converting said solution to a vapor;
    contacting said vapor with particles formed of a material selected from the group consisting of calcined alumina, calcined zirconia, or mixtures thereof, to combine the fluoride in said vapor with the particles; and
    condensing the vapor from which the fluoride has been removed.

2. The method of claim 1 wherein said particles are formed of calcined alumina.

3. The method of claim 1 wherein said particles are formed of calcined zirconia.

* * * * *